US012725528B2

(12) United States Patent
Ayhan

(10) Patent No.: US 12,725,528 B2
(45) **Date of Patent: *Sep. 1, 2026**

(54) SELECTING ALTITUDE CHANGING PHASE ROUTES FOR AIRCRAFT

(71) Applicant: The Boeing Company, Arlington, VA (US)

(72) Inventor: Samet Ayhan, Fairfax, VA (US)

(73) Assignee: The Boeing Company, Arlington, VA (US)

(*) Notice: Subject to any disclaimer, the term of this patent is extended or adjusted under 35 U.S.C. 154(b) by 142 days.

This patent is subject to a terminal disclaimer.

(21) Appl. No.: 18/671,612

(22) Filed: May 22, 2024

(65) Prior Publication Data

US 2025/0165005 A1 May 22, 2025

Related U.S. Application Data

(60) Provisional application No. 63/600,977, filed on Nov. 20, 2023.

(51) Int. Cl.
*G08G 5/32* (2025.01)
*B64D 45/00* (2006.01)
(Continued)

(52) U.S. Cl.
CPC ............... *G08G 5/32* (2025.01); *B64D 45/00* (2013.01); *G05D 1/48* (2024.01); *G05D 1/644* (2024.01);
(Continued)

(58) Field of Classification Search
CPC . G08G 5/32; B64D 45/00; G05D 1/48; G05D 1/644; G05D 2101/15; G05D 2109/20
See application file for complete search history.

(56) References Cited

U.S. PATENT DOCUMENTS 6,266,610 B1 * 7/2001 Schultz ................ G05D 1/1062 701/533
9,177,480 B2 * 11/2015 Subbu ...................... G08G 5/56
(Continued)

FOREIGN PATENT DOCUMENTS

CN 111047913 A * 4/2020 ............... G08G 5/32
DE 112020004302 T5 * 8/2022 ............ G06N 3/044
(Continued)

OTHER PUBLICATIONS

Translation of JP-2020077387-A, 15 pages (Year: 2020).*
(Continued)

*Primary Examiner* — Dale W Hilgendorf
(74) *Attorney, Agent, or Firm* — Alleman Hall LLP

(57) ABSTRACT

A method for selecting an altitude changing phase route for an aircraft is presented. The method comprises receiving sequences of multivariate flight data from at least one prior flight, receiving a set of flight parameters for the aircraft including at least a total altitude change and a takeoff weight, and receiving a set of candidate altitude changing phase routes having candidate step profiles. For each candidate altitude changing phase route, a sequence of fuel burn quantities is predicted for the respective candidate step profile based on at least the sequences of multivariate flight data and the set of flight parameters. The fuel burn quantities are summed over the candidate altitude changing phase route to obtain an estimated fuel burn. A preferred candidate altitude changing phase route having a lowest estimated fuel burn is indicated.

20 Claims, 11 Drawing Sheets

(51) Int. Cl.

| | |
|---|---|
| ***G05D 1/48*** | (2024.01) |
| ***G05D 1/644*** | (2024.01) |
| ***G05D 101/15*** | (2024.01) |
| ***G05D 109/20*** | (2024.01) |

(52) U.S. Cl.
CPC ..... *G05D 2101/15* (2024.01); *G05D 2109/20* (2024.01)

(56) References Cited

U.S. PATENT DOCUMENTS

| | | | | |
|---|---|---|---|---|
| 9,208,457 | B2 * | 12/2015 | Agrawal | G08G 5/32 |
| 9,564,056 | B1 * | 2/2017 | Ghaemi | G06F 17/13 |
| 10,935,984 | B2 * | 3/2021 | Lax | G05D 1/042 |
| 2009/0204453 | A1 * | 8/2009 | Cooper | G05D 1/0005 705/7.36 |
| 2010/0036547 | A1 * | 2/2010 | Myers | G08G 5/32 701/3 |
| 2010/0191458 | A1 * | 7/2010 | Baker | G08G 5/32 705/40 |
| 2013/0046422 | A1 * | 2/2013 | Cabos | G08G 5/32 701/120 |
| 2013/0221164 | A1 * | 8/2013 | Klooster | G05D 1/0607 244/180 |
| 2014/0012436 | A1 * | 1/2014 | Coulmeau | G08G 5/32 701/3 |
| 2014/0018980 | A1 * | 1/2014 | Bollapragada | G08G 5/55 244/180 |
| 2016/0093217 | A1 * | 3/2016 | Hale | G08G 5/76 701/120 |
| 2017/0032682 | A1 * | 2/2017 | Moser | G06Q 50/40 |
| 2018/0067500 | A1 * | 3/2018 | Kim | G08G 5/55 |
| 2018/0261105 | A1 * | 9/2018 | Garrido-Lopez | G06Q 10/047 |
| 2021/0073995 | A1 * | 3/2021 | Yang | G06N 3/0464 |
| 2022/0100205 | A1 * | 3/2022 | Darnell | G05D 1/106 |
| 2024/0150034 | A1 * | 5/2024 | Berna | B64D 45/00 |
| 2025/0111788 | A1 * | 4/2025 | Bart | G06Q 50/40 |
| 2025/0163855 | A1 * | 5/2025 | Ayhan | G06Q 10/0631 |
| 2025/0166515 | A1 * | 5/2025 | Ayhan | G08G 5/32 |
| 2025/0182631 | A1 * | 6/2025 | Jouniaux | G06F 18/231 |
| 2025/0391279 | A1 * | 12/2025 | Rubio | G08G 5/21 |

FOREIGN PATENT DOCUMENTS

| | | | | | |
|---|---|---|---|---|---|
| JP | 2020077387 | A | * | 5/2020 | G08G 5/32 |
| KR | 102555897 | B1 | * | 7/2023 | B64D 45/00 |
| WO | 2008096376 | A1 | | 8/2008 | |
| WO | WO-2021172673 | A1 | * | 9/2021 | B64C 39/024 |

OTHER PUBLICATIONS

Translation of CN-111047913-A, 17 pages (Year: 2020).*
Translation of KR-102555897-B1, 13 pages (Year: 2023).*
Translation of WO-2021172673-A1, 8 pages (Year: 2021).*
Translation of DE-112020004302-T5, 85 pages (Year: 2022).*
European Patent Office, Extended European Search Report Issued in Application No. 24210589.8, Apr. 25, 2025, 11 pages.
European Patent Office, Office Action Issued in Application No. 24210589.8, Apr. 28, 2026, Germany, 10 pages.
Khan, W. et al., "A novel self-organizing constructive neural network for estimating aircraft trip fuel consumption," Transportation Research Part E, vol. 132, Nov. 15, 2019, 25 pages.

* cited by examiner

100

SELECTING ALTITUDE CHANGING PHASE ROUTES FOR AIRCRAFT

CROSS REFERENCE TO RELATED APPLICATIONS

This application claims priority to U.S. Provisional Application No. 63/600,977, entitled "METHODS FOR DETERMINING FUEL BURN IN CLIMB AND DESCENT PHASES OF FLIGHTS" filed Nov. 20, 2023, the entirety of which is hereby incorporated herein by reference for all purposes.

FIELD

This disclosure relates generally to commercial aviation and more particularly to predicting the fuel consumption and carbon dioxide emissions of an aircraft during climb and descent phases of a flight.

BACKGROUND

As efforts to combat global warming and climate change become priorities for public and private enterprise alike, it has become increasingly important to monitor and record carbon dioxide emissions to the atmosphere. A major contributor to atmospheric carbon dioxide emissions is air transportation. As such, both governments and the air travel industry place increased focus on monitoring the carbon footprints of air transportation, implementing emissions targets and mitigation measures.

SUMMARY

A method for selecting an altitude changing phase route for an aircraft is presented. The method comprises receiving sequences of multivariate flight data from at least one prior flight, receiving a set of flight parameters for the aircraft including at least a total altitude change and a takeoff weight, and receiving a set of candidate altitude changing phase routes having candidate step profiles. For each candidate altitude changing phase route, a sequence of fuel burn quantities is predicted for the respective candidate step profile based on at least the sequences of multivariate flight data and the set of flight parameters. The fuel burn quantities are summed over the candidate altitude changing phase route to obtain an estimated fuel burn. A preferred candidate altitude changing phase route having a lowest estimated fuel burn is indicated.

This Summary is provided in order to introduce in simplified form a selection of concepts that are further described in the Detailed Description. This Summary is not intended to identify key features or essential features of the claimed subject matter, nor is it intended to be used to limit the scope of the claimed subject matter. The claimed subject matter is not limited to implementations that solve any disadvantages noted in any part of this disclosure.

DETAILED DESCRIPTION

Figure 1:
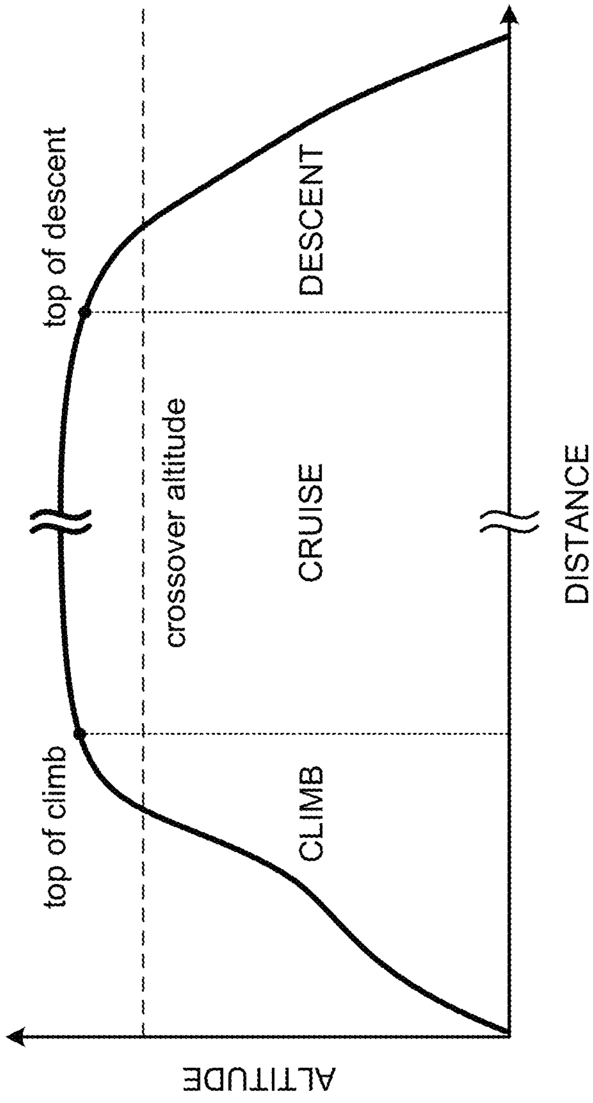
FIG. 1 schematically shows the climb, cruise, and descent phases of an example flight.

The operating cost of an aircraft correlates directly to the quantity of fuel it consumes. In the aviation industry that quantity is called 'fuel burn'. Fuel burn also correlates directly to emissions of carbon dioxide, nitrogen oxides, ozone, and acoustic noise from an aircraft, all of which have adverse impacts on climate and health. Thus, economic and environmental factors provide, in parallel, strong motivation to limit fuel burn in commercial aviation.

Meeting that objective systematically requires the ability to predict and reduce fuel burn on a flight-by-flight basis. A major mitigation measure is to utilize various operational efficiency solutions such as choosing continuous climb over step climb and continuous descent over step descent to reduce carbon emissions. Although the qualitative value of continuous descent over step descent and continuous climb over step climb is well-known, their impact on carbon emissions has not been quantified, making it difficult for airlines to calculate the amount of carbon emissions a flight produces when it performs step climb vs continuous climb or step descent vs continuous descent.

The aviation industry has a goal of zero carbon emissions by the year 2050. In order to achieve that, airlines need to monitor how much $CO_2$ they are adding to the atmosphere each year and need to aggregate their fleet emissions to come up with ways of maintaining or reducing emissions.

Herein, a novel data-driven sustainability solution is presented that includes a set of algorithms to assess the impact of step climb profiles and step descent profiles on $CO_2$ emissions that a flight produces. The methodology provides a quantitative value of savings in fuel burn and $CO_2$ emissions if a flight performs step climb or descent using specific step profiles. The disclosed methodology also uses Machine Learning techniques to formulate the amount of savings in carbon emissions and fuel burn for each flight based on two configurable parameters: step size and threshold.

The disclosed methodology provides an ability for airlines to consider what-if scenarios, such as varied step climb or step descent profiles for a flight and calculate the amount of carbon emissions it yields under each scenario. This translates to a carbon emissions optimization capability for the climb and descent phases of a flight.

To deliver these capabilities, the disclosed methodology uses historical Continuous Parameter Logging (CPL) data and categorizes flights based on their origin-destination pair, aircraft type and operator (e.g., airline). Next, flights in each category are split into three phases (climb, cruise, and descent) based on their labels in the CPL data. Using only climb and descent phases, flights are further split into two subcategories for each phase: continuous climb, step climb, continuous descent, and step descent. The disclosed methodology uses a novel algorithm, similar to the well-known 'connected component labeling', in which it searches a level-off defined by two configurable parameters: threshold, which is the delta flight level between time steps and step size, which is the time period the aircraft remains level-off, i.e., within the boundaries of threshold. In addition to its high level of accuracy, the methodology also provides high efficiency. Once the historical CPL data categorization has been completed, running the algorithms to make inference is extremely fast.

The methodology can be used to provide predicted emissions savings for flights so that customers can quantify their fleet's impact on the environment. The methodology can be marketed and sold as a commercial service to airlines and air navigation service providers (ANSPs). Airlines using this methodology can accurately calculate carbon emissions/fuel burn their flights would produce under different scenarios to find the most optimal departure and arrival profiles. Aside from emissions standards, airlines also stand to benefit from the reduction in fuel burn costs.

While continuous climb or descent may generally produce less emissions, there are scenarios wherein a stepped climb or descent is necessary. Each flight has a time window allotted to it. Occasionally, a runway may not be available when a plane approaches an airport, and a pilot may need to step descend to stall for time. Airspace complexity may necessitate stepped climb or descent to prevent collisions or reduce conflict between planes. Knowing which conditions for stepped climb or descent are optimal can reduce emissions.

If circumstances change during a flight, the methodology herein can be used to determine how many additional steps and/or how long those steps are, and/or what level of altitude delta to determine a path to lowest possible emissions and fuel burn. The methodology could be invoked online, based on the airplane's cruise height, weight, etc. to determine a best-case stepped descent profile.

To determine the quantitative impact on emissions of altitude changing phase step profiles on emissions, historical CPL data may be analyzed, such as for transatlantic flights. As an example, the resulting flights with one step descent profile may be compared to those with a second step descent profile by computing delta in fuel consumption or emissions.

Each flight profile can be divided into a climb phase, a cruise phase, and a descent phase, as represented at 100 in FIG. 1. The climb phase extends from takeoff from the departure airport to the top of climb, where the cruise phase begins. The cruise phase is typically marked by long periods of level altitude above the crossover altitude (wherein the indicated airspeed becomes a Mach number). The descent phase extends from the end of the cruise phase (top of descent) to touchdown and landing. Airspace operational efficiency operates with an established set of parameters that give an advantage to selecting one type of flight path over another during an altitude changing phase of a flight (e.g., cruise or descent phase).

The impact of stepped altitude changing routes on carbon emissions has never been quantified before. Overall, the current methodology can be extremely valuable to the aviation industry worldwide, by which they can calculate an aggregated amount of carbon emissions, flights produce worldwide under various conditions such as various altitude changing phase step profiles to monitor and achieve their net-zero carbon emissions goal by 2050.

To address these issues and provide further advantages, this disclosure presents a deep-learning, data-driven, stochastic tool for aircraft fuel burn prediction on a flight-by-flight basis. The fuel burn prediction is defined as a sequence-learning problem, where it is assumed that fuel burn can be described as a function of time-resolved flight-data recorder (FDR) and atmospheric data. Given a set of prior flights of varying lengths, with such data provided, the trained model predicts fuel burn at every time step along a planned flight. In some examples the model employs an encoder-decoder (E-D) long short-term memory (LSTM) architecture.

Given a set of prior flights with associated FDR and atmospheric data, the training objective is to train a model that predicts fuel burn for another flight before it departs. To address this problem, a flight is defined as a sequence of sensor readings at a particular frequency. A 'sequence' is a set of values in a specified order; herein the values are ordered according to ascending or descending time. In some examples the time step between adjacent values in a sequence is fixed. This type of sequence can also be called a 'time series'. If the flight time is 8 hours and the frequency of the sensor readings is 1 Hz, then, for all sensors the flight is defined by 28800 time steps, with one reading recorded for each sensor at each time step. Due to the observed variation in flight time, even between fixed departure and arrival airports, the historical FDR data has varying length for each flight and flight phase. Accordingly, the models here disclosed must address a multivariate, multi-step sequence prediction problem for the climb and descent phases of a flight. Once the model is trained and validated against other competing models, it may be used to predict fuel burn for altitude changing phases of flight based on step profiles.

The disclosed methodology thus provides a quantitative value of savings in fuel burn and $CO_2$ emissions if a flight utilizes a particular step profile for an altitude changing phase. The disclosed methodology also uses Machine Learning techniques to formulate the amount of savings in carbon emissions and fuel burn for each flight based on various meteorological parameters that define the step profile of the route.

To deliver these capabilities, the disclosed methodology uses CPL data and categorizes flights based on their origin-destination pair, aircraft type and operator (airline). Next, flights in each category are split into three phases (climb, cruise, and descent) based on their labels in the CPL data. To that end, the sequence of flight phases in varying lengths may be adjusted, for each route, into a sequence of flight phases in fixed length. This may be achieved by padding the shorter sequences. For climb phases and descent phases, flights are further split into sub-categories based on their step profiles as well as other flight parameters, such as altitude, lateral distance, and takeoff weight. Using these combinations, the disclosed methodology creates discrete categories of altitude changing phases. Furthermore, to match the lateral distances between any two sets, the disclosed methodology adds an additional fuel burn amount to the flight set that presents shorter average lateral distance.

Black box/flight data recorder data or CPL data may be analyzed. Up to 2500 sensors or more may record data at 1 Hz frequency. Some of this data may be repetitive or unnecessary and may be discarded. Parameters discerned from the raw sensor data can then be used to categorize each climb or descent phase as continuous or stepped. A set of parameters are extracted from the historical CPL data in the form of a time series as follows: time, latitude, longitude, altitude, aircraft weight, flight phase, fuel flow-left engine, fuel flow-right engine. To perform the methodology, compute power, CPU and memory are used by an engineering workstation to efficiently execute the task.

Figures 2A, 2B:
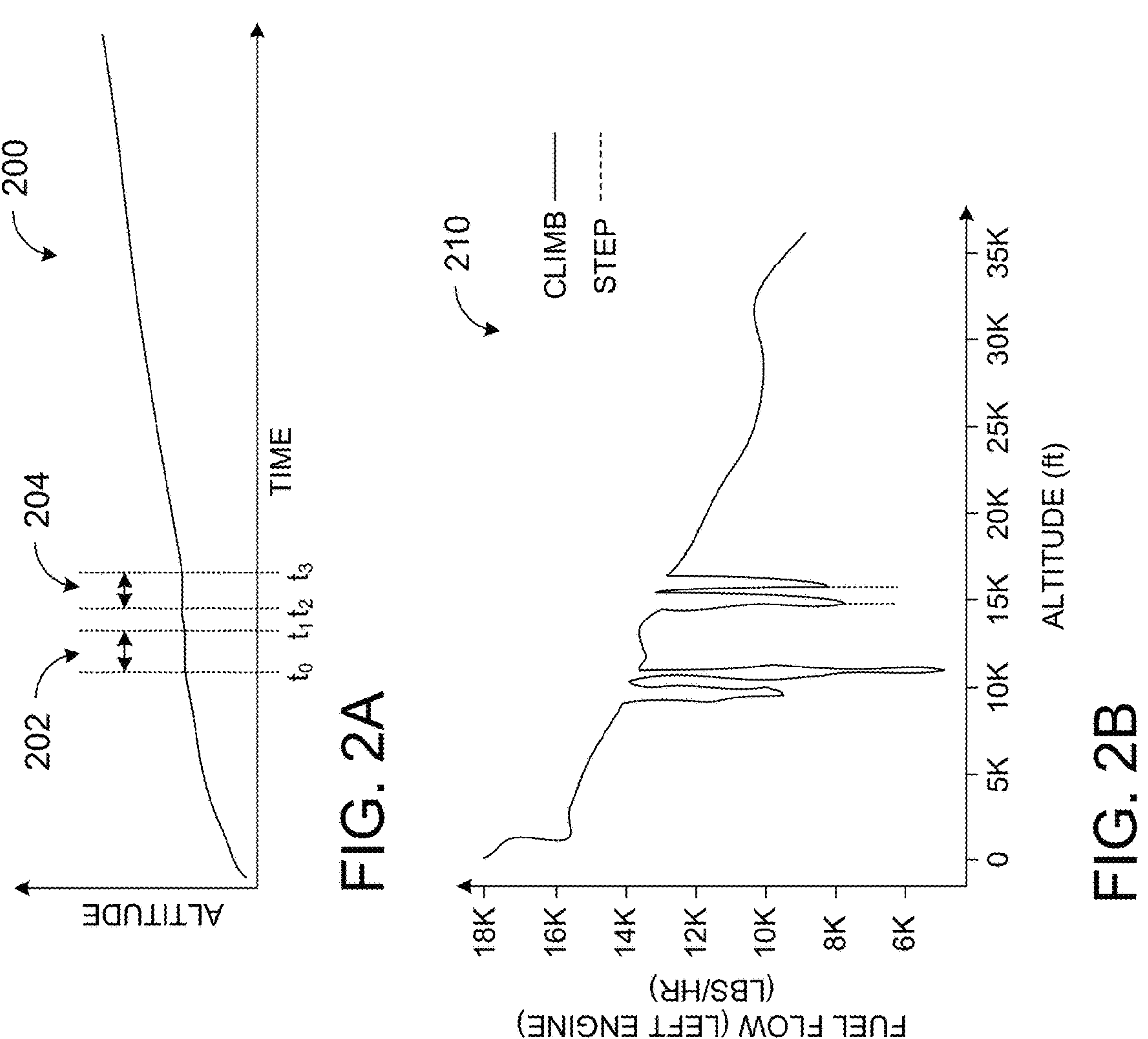
FIG. 2A shows a plot of altitude over time for an example climb phase of a flight.
FIG. 2B shows a plot of fuel flow versus altitude for the example climb phase of FIG. 2A.

FIG. 2A shows an example plot 200 indicating altitude over time for an example climb phase for an aircraft. Two steps (202, 204) are identified based on their verticality over time. FIG. 2B shows an example plot 210 indicating fuel flow versus altitude for the climb phase of plot 200. Steps 202 (shown in dashed lines between time to $t_0$ time $t_1$) and 204 (shown in dashed lines between time $t_2$ to time $t_3$) are identifiable based on a lack of change of altitude, while fuel flow continues to accumulate to maintain the altitude of the aircraft.

Figures 2C, 2D:
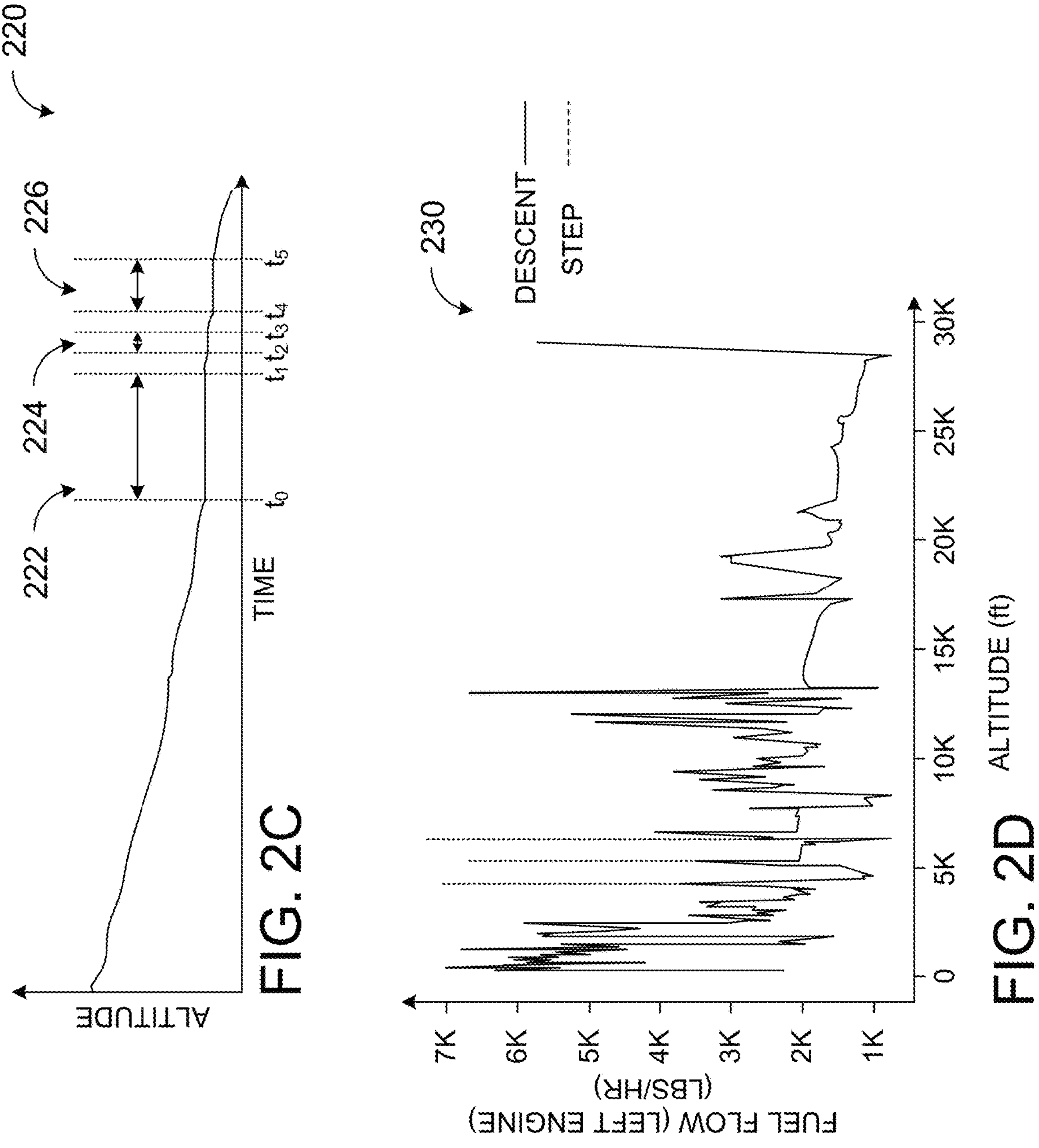
FIG. 2C shows a plot of altitude over time for an example descent phase of a flight.
FIG. 2D shows a plot of fuel flow versus altitude for the example descent phase of FIG. 2C.

FIG. 2C shows an example plot 220 indicating altitude over time for an example descent phase for an aircraft. Three steps (222, 224, 226) (shown in dashed lines) are identified based on their verticality over time. FIG. 2D shows an example plot 230 indicating fuel flow versus altitude for the descent phase of plot 200. Steps 222 (shown in dashed lines between time to $t_0$ time $t_1$), 224 (shown in dashed lines between time $t_2$ to time $t_3$), and 226 (shown in dashed lines between time $t_4$ to time $t_5$) are identifiable based on a lack of change of altitude, while fuel flow continues to accumulate to maintain the altitude of the aircraft.

Using the categorized CPL dataset, the disclosed methodology also runs a series of Machine Learning (linear, non-linear, ensemble) and Deep Learning algorithms (Recurrent Neural Networks) based on at least two flight parameters (e.g., step size and step threshold) and builds a number of regression models, which compete with each other for higher accuracy. The top-ranking algorithm is used to formulate the amount of savings in carbon emissions and fuel burn for each flight. An added benefit is that the predictions can be made prior to fueling, thereby limiting the initial weight of the aircraft and further reducing the fuel consumption and emissions.

Figure 3:
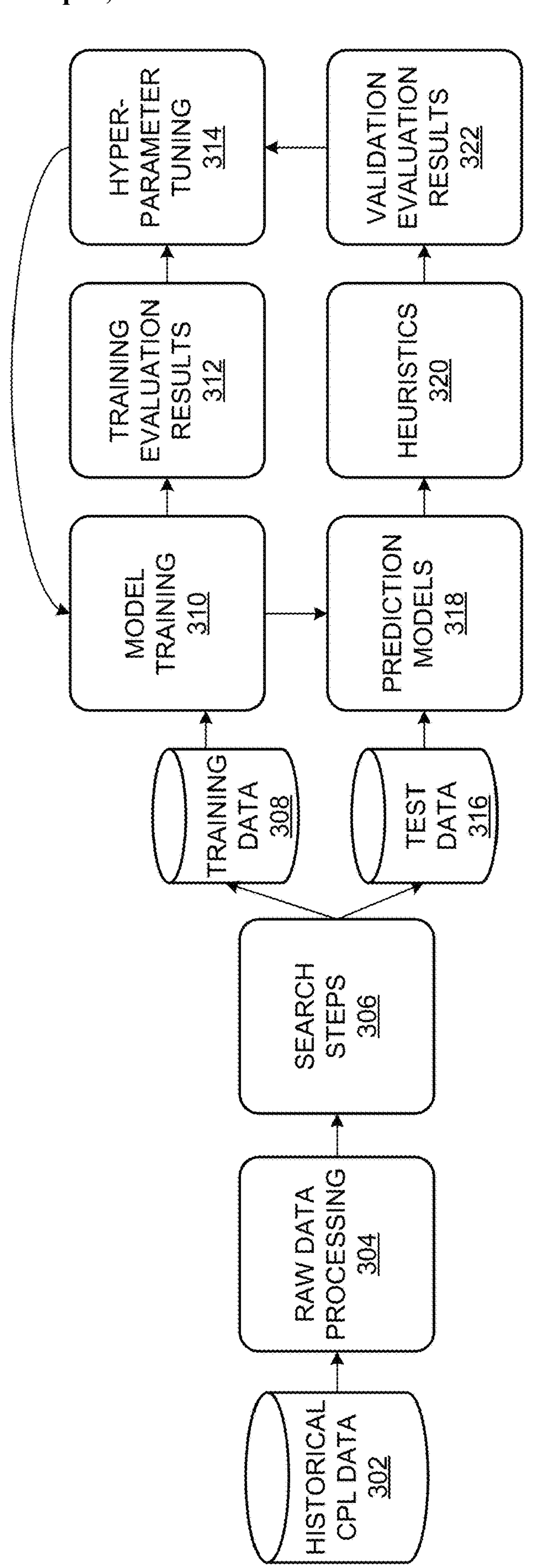
FIG. 3 schematically shows an example machine learning pipeline.

FIG. 3 schematically shows an example machine learning pipeline 300 that may be used to train a model for inferring fuel burn and emissions for altitude changing phases of flights based on step profile. Machine learning pipeline 300 uses a data-driven approach, e.g., historical data for actual flown flights. Hence, the quantitative value of fuel burn computed is based on ground truth. Mapping the fuel burn and emissions involves training various regression models and inferring the fuel burn/emissions as sorted by step profile. Using a categorized CPL dataset, machine learning pipeline 300 runs a series of Machine Learning (linear, non-linear, ensemble) and Deep Learning algorithms (Recurrent Neural Networks, LSTMs) based on configurable parameters (e.g., step size, altitude change over lateral distance) and builds a number of regression models, which compete with each other for higher accuracy. The top-ranking algorithm is used to formulate the amount of savings in carbon emissions and fuel burn for each altitude changing phase. Such a machine learning pipeline may be selected to be specific to aviation. The resulting models may be specific to fuel burn/emissions, and to the climb or descent phase of each flight. Because there is a time series in the data, machine learning pipeline 300 may be specific to sequence-to-sequence learning problems. As such, long short-term memory models may be used.

Historical CPL data 302 may include multivariate data for one or more prior flights. A set of parameters are extracted from the historical CPL data in the form of a time series including time, latitude, longitude, altitude, aircraft weight, flight phase, fuel flow-left engine, fuel flow-right engine. Atmospheric conditions may also be provided in historical data, such as wind speed, wind direction, temperature, pressure, humidity, etc.

Machine learning pipeline 300 takes historical data, such as CPL data and feeds it into raw data processing 304. Raw data processing 304 includes at least dimensionality reduction and feature engineering to select the salient features of the data. Raw data processing 304 may aid in developing data sets that are more granular and more adapted, yielding more accurate results. Raw data processing 304 may further include data normalization, such as by normalizing climb and descent phases by distance. This may include padding altitude changing phases in some instances and paring altitude changing phases in other instances to generate clusters of data having a same or similar distance.

Raw data processing may include iteratively reducing the number of parameters that get fed into model training. Raw data processing may include performing parameter correlations. The historic and CPL data may comprise hundreds of parameters recorded at 1 Hz frequency, and not all may be predictive for fuel burn over altitude changing phases.

In some examples, processed raw data is selected as training data 308 and fed directly into model training 310. However, for increased accuracy and confidence, the processed raw data may first be fed into search steps 306. Search steps 306 are performed on the processed data. Search steps 306 comprises a heuristics algorithm that is used to first identify those steps, capturing how many steps are in the profile, how long each step is, and what the threshold in each step is. Search steps 306 then looks at how those steps are mapped to the additional emissions or fuel burn. Search steps 306 may take into account aircraft type, origin-destination, pair, airline etc.

Initially, it can be determined what constitutes a step in a climb or descent phase. Search steps 306 may employ one or more algorithm, e.g., similar to connected component labeling, which starts from the initial climb or descent altitude and logs the subsequent altitudes on a step-wise basis. If the difference in the flight level across a time stamp is less than a threshold, the step is expanded. If and when the expanded step becomes greater than the designated step size it is marked as a step, otherwise the proto-step may be dropped.

Figure 4:
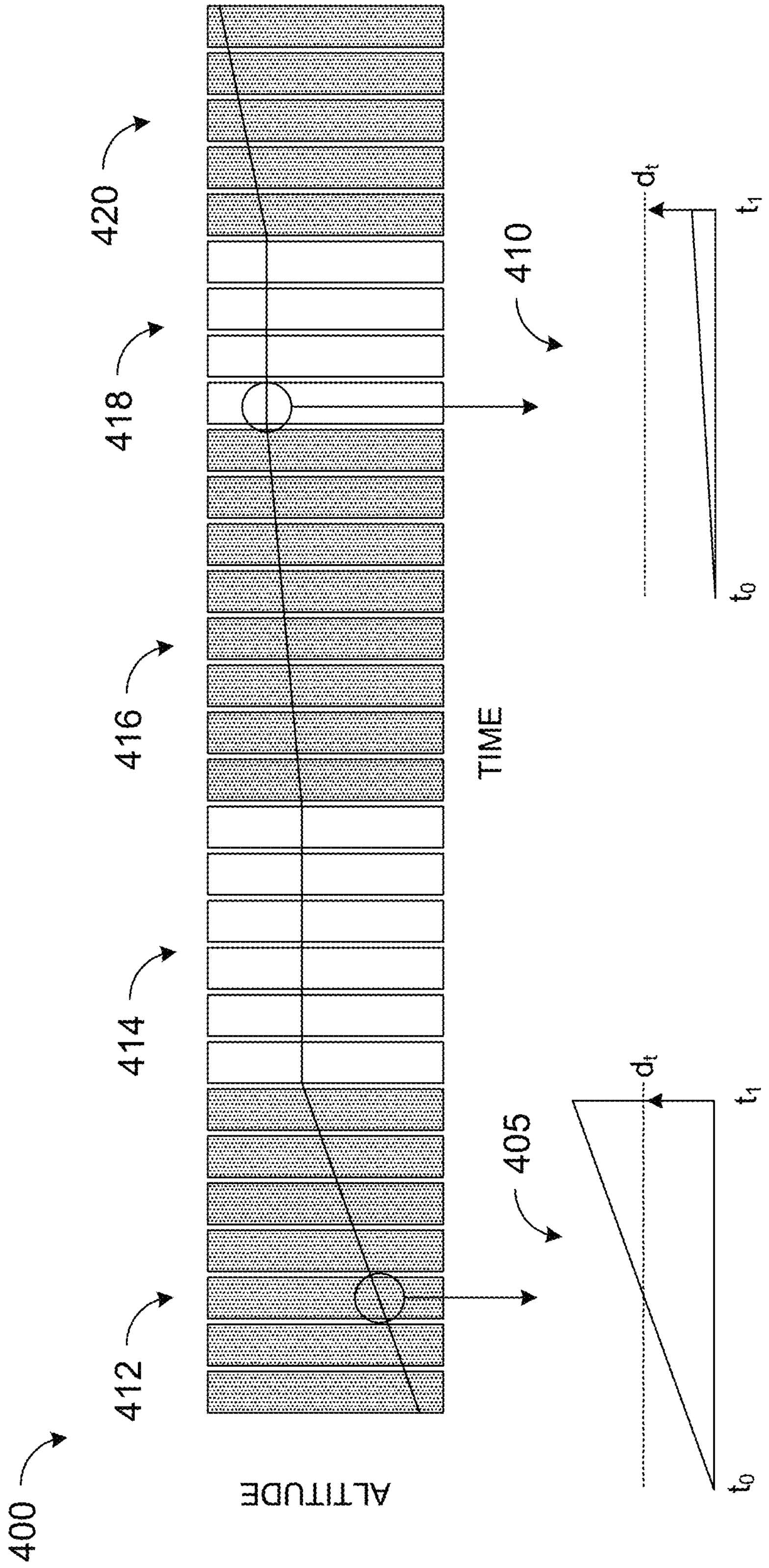
FIG. 4 shows an example plot of altitude over a sequence of time stamps for an example climb phase.

FIG. 4 illustrates a plot 400 indicating altitudes for a stepped climb across a series of time stamps. Machine learning models and/or neural networks can be used to formulate the length of a step as well as the delta in difference in altitude. Looking end to end across a time stamp, two parameters are accounted for—the amount of difference in altitude ($d_t$) across a time stamp and the combined length of time stamps exhibiting an above threshold altitude change (climb segment, as shown at 405) or the combined length of time stamps exhibiting a below threshold altitude change (step segment, as shown at 410). By taking into account those 2 parameters, the amount of additional emissions generated by the following steps can be determined.

For example, by looking at the altitude at each timestamp in plot 400, it can be determined how much the aircraft climbed over the time stamp. If the starting and ending altitudes are within a threshold, then the step is expanded to the next time step. This starts the connected component labeling algorithm. The difference and altitude and time duration needed to be considered a step may be adjusted per application. As shown in FIG. 4, plot 400 thus includes a first climb segment 412, a first step segment 414, a second climb segment 416, a second step segment 418, and a third climb segment 420.

As shown in FIG. 3, search steps 306 then looks at how those altitude changing phases are mapped to the additional emissions or fuel burn. Search steps may take into account take-off weight, top-of-climb weight, top-of-descent weight, aircraft type, origin-destination pair, airline etc.

Parsed data may then be analyzed to determine the right step size (seconds) and threshold (feet) to use in categorizing steps. The combination of step size and threshold may be adjusted based on which combinations produce datasets with sufficient size to evaluate future flight paths.

Once the flights with step climb and step descent have been identified, a comparative analysis may be performed between step climb profiles and between step descent profiles. However, to make a fair comparison, the disclosed methodology uses sets of step climbs, where their top-of-climb (ToC) level and take off weights (ToW) match. Similarly, the disclosed methodology uses sets of step descents, where their top-of-descent (ToD) level and weights at ToD match.

Flight phases can be further sorted by mean lateral distances. If the mean lateral distance of a single step climb is larger, that delta is added to another one step climb for comparison. An additional fuel burn amount can then be added to the flight set that presents shorter average lateral distance.

Figures 5A, 5B, 5C, 5D:
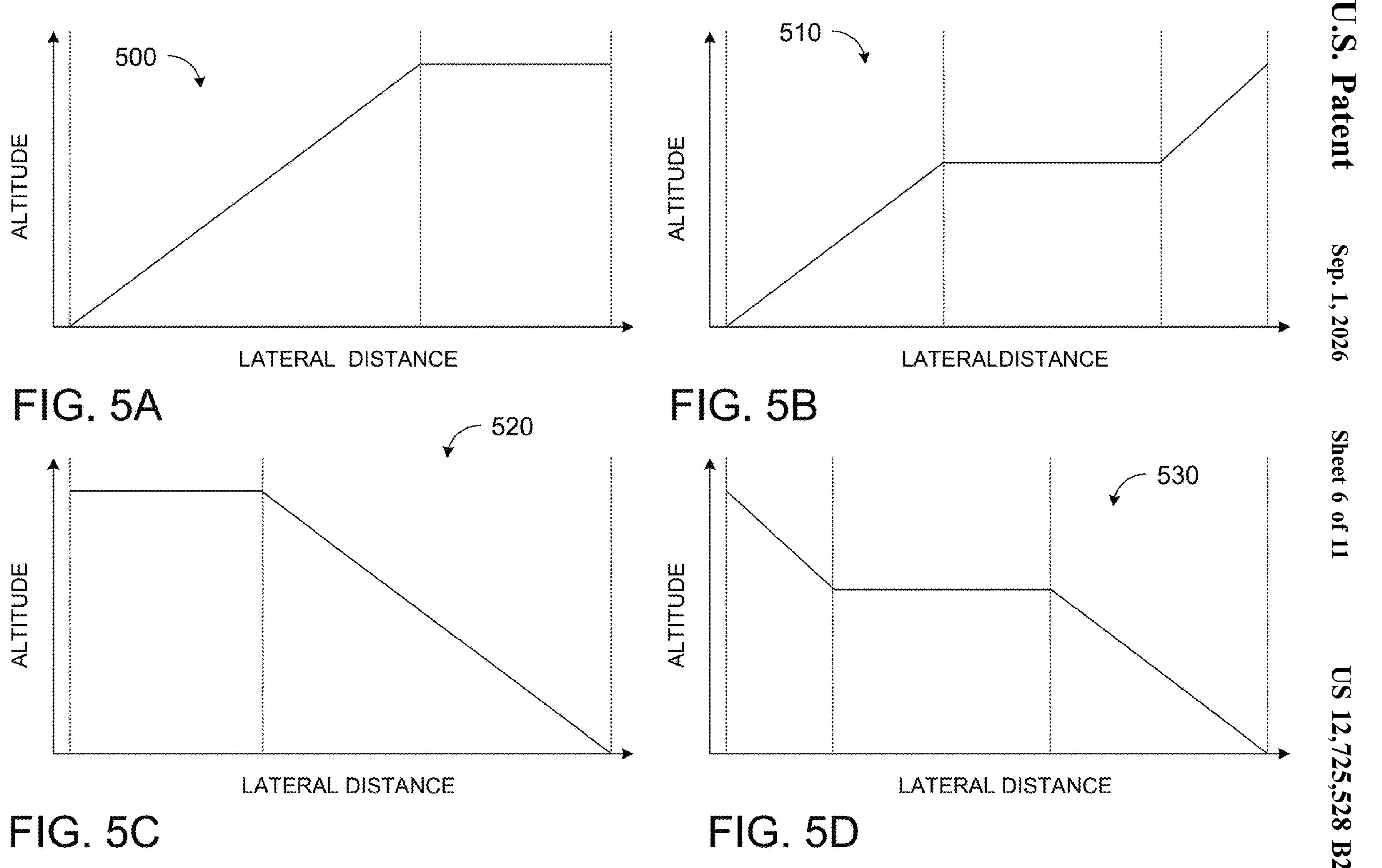
FIG. 5A shows an example plot of altitude over lateral distance for an example continuous climb phase.
FIG. 5B shows an example plot of altitude over lateral distance for an example stepped climb phase.
FIG. 5C shows an example plot of altitude over lateral distance for an example continuous descent phase.
FIG. 5D shows an example plot of altitude over lateral distance for an example stepped descent phase.

FIGS. 5A and 5B show plots of climbs phases over differing lateral distances. FIG. 5A shows a flight profile 500 with a continuous climb and single level step. FIG. 5B shows a flight profile 510 with two portions of a climb around a step segment. FIGS. 5C and 5D show plots of step descents over differing lateral distances. FIG. 5C shows a flight profile 520 with a continuous descent and single level step. FIG. 5D shows a flight profile 530 with two portions of a descent around a step segment.

Evening lateral distances between flight profile 500 and flight profile 510, or between flight profile 520 and flight profile 530 increases the number of flights that can be compared within a discretized bucket. For example, single step flight profiles can be padded or pared to match with other single step flight profiles.

Step climb flights may be sorted by top-of-climb height and takeoff weight. Similarly, step descent flights may be sorted based on top-of-descent height and takeoff weight (and/or top-of-descent weight). Once that comparison has been made, the number of steps, and the length of the steps can be evaluated to determine how much additional emissions are generated.

In one example, flight phases for step climb and continuous climb based on 470 historical flights between London and New York were compared where ToC was equal to 36,000 ft, and where initial weight was 460,000 lbs. For step climb, the mean left engine fuel burn was 5314.0475942315 lbs and the mean right engine fuel burn was 5338.417104848226 lbs for an average total fuel burn (left and right) of 5326.232 lbs. For continuous climb, the mean left engine fuel burn was 4624.333444281684 lbs and the mean right engine fuel burn was 4631.015968254937 lbs for an average total fuel burn (left and right) of 4627.675 lbs. This represents a 13.1% fuel savings by performing continuous climb vs step climb.

When delta lateral distance (e.g., cruise segments) was taken into consideration, mean additional fuel flow to the left engine due to the cruise segment was 470.99692884657117 lbs. Mean additional fuel flow to the right engine due to the cruise segment was 471.727897237142 lbs. For step climb, the total mean left engine fuel burn was 5314.0475942315 lbs and the total mean right engine fuel burn was 5338.417104848226 lbs for an average total fuel burn (left and right) of 5326.232 lbs. For continuous climb, the total mean left engine fuel burn was 5095.330373128255 lbs and the total mean right engine fuel burn was 5102.74386549208 lbs for an average total fuel burn (left and right) of 5099.037 lbs.

This represents a 4.3% fuel savings by performing continuous climb vs step climb. Converting fuel burn to emissions, when delta lateral distance (e.g., cruise segment) is not taken into consideration continuous climb generates 4.2% less emissions compared to step climb. When delta lateral distance (e.g., cruise segment) is taken into consideration continuous climb generates 0.7% less emissions compared to step climb.

In another example, flight phases for step descent and continuous descent based on 218 historical flights between London and New York were compared where ToC was equal to 37,000 ft, and where weight at top-of-descent was 370,000 lbs. For step descent, the mean left engine fuel burn was 1690.6203962495592 lbs and the mean right engine fuel burn was 1715.0876797442966 lbs for an average total fuel burn (left and right) of 1702.854 lbs. For continuous descent, the mean left engine fuel burn was 1062.4297760899863 lbs and the mean right engine fuel burn was 1073.3230303870307 lbs for an average total fuel burn (left and right) of 1067.876 lbs. This represents a 37.3% fuel savings by performing continuous descent vs step descent.

When delta lateral distance (e.g., cruise) are taken into consideration, mean additional fuel flow to the left engine due to the cruise segment was 411.17582322119245 lbs. Mean additional fuel flow to the right engine due to the cruise segment was 412.2433751557293 lbs. For step descent, the total mean left engine fuel burn was 1690.6203962495592 lbs and the total mean right engine fuel burn was 1715.0876797442966 lbs for an average total fuel burn (left and right) of 1702.854 lbs. For continuous descent, the total mean left engine fuel burn was 1473.6055993111786 lbs and the total mean right engine fuel burn was 1485.56640554276 lbs for an average total fuel burn (left and right) of 1479.586 lbs.

This represents a 13.1% fuel savings by performing continuous descent vs step descent. Converting fuel burn to emissions, when delta lateral distance (cruise segment) is not taken into consideration continuous descent generates 25.9% less emissions compared to step descent. When delta lateral distance (cruise segment) is taken into consideration continuous descent generates 12.4% less emissions compared to step descent.

Returning to FIG. 3, some or all of the historical step searched data is treated as training data 308 and fed into model training 310. Two or more prediction models may be used for model training 310, including various types of prediction models. Such prediction models may include linear regression, lasso, elastic net for non-linear classification regression, trees, support, vector, regression views, k nearest neighbors, ensemble models, extra gradient boosting, random forest, extra trees regression, as well as regular artificial neural networks. A number of architectures may be used in competitive fashion to determine a single best model. The inputs for each model may be the same or similar, but the outputs, hidden layers, number of neurons in each layer, etc. may vary across models. Models may be run in parallel and in a distributive fashion with the goal of selecting the best performing model as a predictive model.

Sequence prediction often involves predicting the next value in a sequence, which can be framed as a sequence prediction problem of one input time step to one output time step, or multiple input time steps to one output time step. A more challenging problem, however, is to take a sequence as input and to return another, predicted sequence as output. This is a sequence-to-sequence (seq2seq) prediction problem, and it is made more challenging when the length of the input and output sequences can vary. An effective approach to seq2seq prediction problems is the encoder-decoder long short-term memory (E-D LSTM) architecture. The system comprises two cooperative models—an encoder for reading the input sequence and encoding it into a fixed-length vector, and a decoder for decoding the fixed-length vector and outputting the predicted sequence.

Consider a sequence $X=\{x^{(1)}, x^{(2)}, \ldots, x^{(L)}\}$ of length L, where each point $x^{(i)} \in \mathbb{R}^m$ is an m-dimensional vector of readings for m variables at time-instance $t_i$. This translates to a scenario in which a flight includes L time steps, where, at each time step $t_i$, m sensor readings are recorded. In one example, an E-D LSTM model is trained to reconstruct instances of the recorded fuel burn. The LSTM encoder learns a fixed length vector representation of the input sequence, and the LSTM decoder uses this representation to reconstruct the output sequence using the current hidden state and the value predicted at the previous time-step.

Given X, $$h_E^{(i)}$$

is the hidden state of the encoder at time $t_i$ for each $i \in \{1, 2, \ldots, L\}$, where $$h_E^{(i)}$$

$\in \mathbb{R}^c$, and c is the number of LSTM units in the hidden layer of the encoder. The encoder and decoder are jointly trained to reconstruct the time-series in reverse order, i.e., the target time-series is $\{x^{(L)}, x^{(L-1)}, \ldots, x^{(1)}\}$. The final state $$h_E^{(L)}$$

of the encoder is used as the initial state for the decoder. A linear layer on top of the LSTM decoder layer is used to predict the target. During training, the decoder uses $x^{(i)}$ as input to obtain the state $$h_D^{(i-1)},$$

and then predict $x'^{(i-1)}$ corresponding to target $x^{(i-1)}$. During inference, the predicted value $x'^{(i)}$ is input to the decoder to obtain $$h_D^{(i-1)}$$

and predict $x'^{(i-1)}$. The model is trained to minimize the objective $$\sum_{X \in s_N} \sum_{i=1}^{L} \left\| x^{(i)} - x'^{(i)} \right\|^2, \quad \text{(Eq. 1)}$$

where $s_N$ is the set of training sequences.

Figure 6:
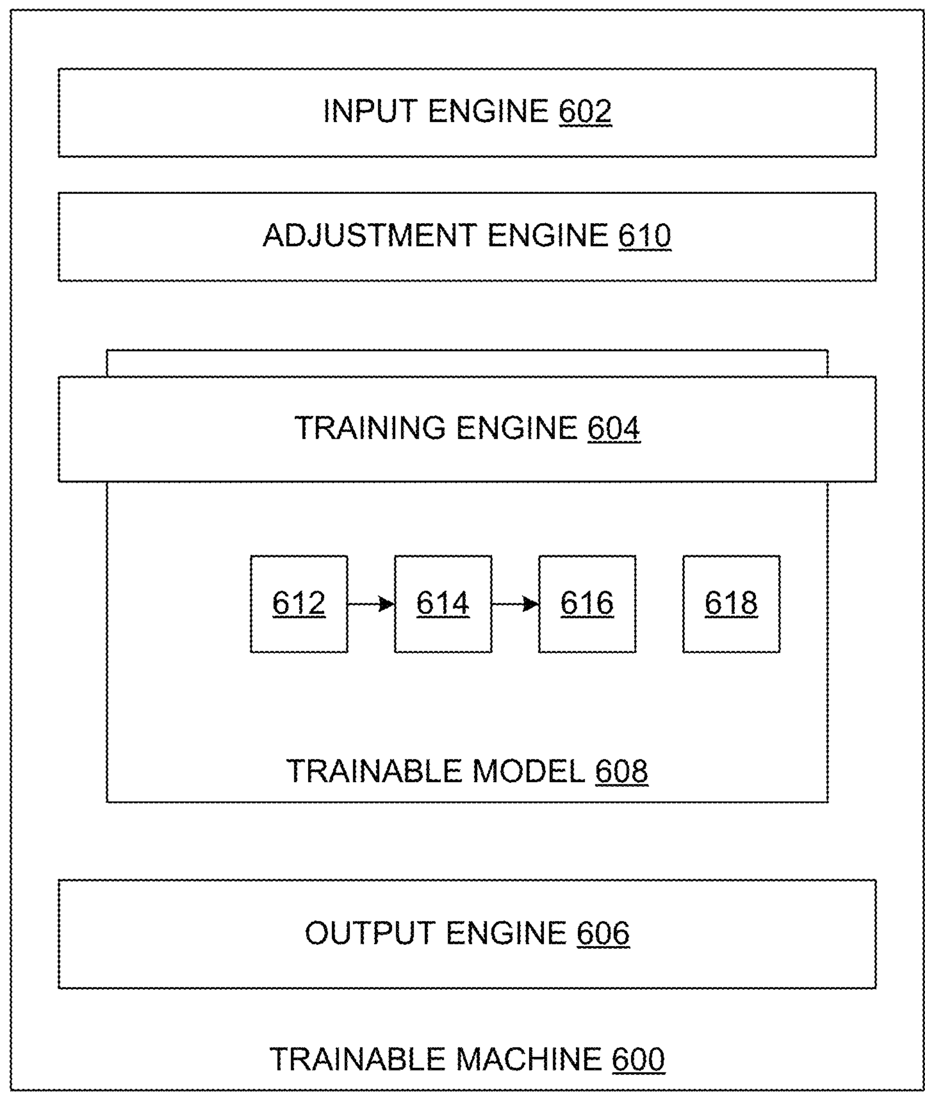
FIG. 6 shows aspects of an example machine trainable to make fuel burn and emissions predictions for aircraft flight.

In this spirit, FIG. 6 shows aspects of an example trainable machine 600 that is trainable to make fuel burn and emissions predictions for aircraft flights during altitude changing segments of a flight based at least on the step profile of a candidate flight track. The trainable machine includes, inter alia, an input engine 602, a training engine 604, an output engine 606, and a trainable model 608.

Input engine 602 is configured to receive training data for altitude changing phases for each of a pre-selected series of prior flights. The training data comprises, for each altitude changing phase of each prior flight of the series, a corresponding sequence of multivariate flight data that was recorded during the prior flight. In some examples each corresponding sequence includes FDR data selected via principle-component analysis. In some examples each corresponding sequence includes atmospheric data.

The trainable machine may further comprise an adjustment engine 610. When included, the adjustment engine may be configured to adjust each corresponding sequence to provide a common phase length for climb phases and descent phases. In some examples and scenarios, adjusting each corresponding sequence comprises padding the corresponding sequence in the flight phase. A given phase can be padded so as to adjust a length of the phase. In some examples and scenarios, adjusting each corresponding sequence may include trimming longer corresponding sequences.

Training engine 604 is configured to process each corresponding sequence of multivariate flight data according to a trainable model 608. As described herein, such processing develops incrementally a hidden state in the trained model. When fully developed, the hidden state is one that minimizes an overall residual for replicating the fuel burn quantities in each corresponding sequence. As noted hereinabove, replicating the fuel burn quantities comprises transforming the multivariate flight data from a previous time step in each corresponding sequence, based on the hidden state.

In some examples trainable model 608 comprises a trainable encoder 612 arranged logically upstream of a trainable decoder 614. The encoder is trainable to emit a vector that featurizes an input sequence of multivariate flight data; the decoder is trainable to replicate the fuel burn quantities of the input sequence based on the vector, thereby generating an output sequence. The number of parameters included in the input sequence may vary from one example to another. In some examples the parameters include, but are not limited to flight date, time, duration, latitude, longitude, aircraft weight, wind speed, wind direction, air temperature, air pressure, altitude, groundspeed, airspeed, etc. Those parameters among others may be used to calculate a step profile. In other examples, other parameters, additional parameters, or fewer parameters may be used. Generally speaking, models trained for specific tracks and specific aircraft may be capable of making accurate predictions based on fewer input parameters than more generally applicable models.

In some examples the encoder and the decoder are configured according to an LSTM architecture. In some examples the trainable model comprises an encoder-decoder LSTM (E-D LSTM) model; a convolutional neural-network (CNN) LSTM encoder-decoder (CNN LSTM E-D) model; or a convolutional LSTM encoder-decoder (ConvLSTM E-D) model. In some examples the trainable model further comprises a fully connected layer 616 configured to interpret the fuel burn quantities at each time step of the output sequence before the final output layer. More particularly, the fully connected layer may be the penultimate layer of the trainable model. The fully connected layer may be configured to feed the output layer (vide infra), which predicts a single step in the output sequence (e.g., not all L steps at once). By way of illustration, consider a flight comprising ten-minute time steps. In the output layer the fuel flow amount may be predicted as a series {120, 1130, 2142, . . . }, where the first number, 120, corresponds to the amount of fuel burned in the first 1-minute time step, the second number corresponds to the amount of fuel burned in the first two time steps (e.g., 11 minutes), and so on. Trainable model 608 may include one or more hyperparameters 618, which may manage machine learning model training. Hyperparameters may be set manually at the outset of training and may be manually or automatically tuned over the course of model training.

When included, an E-D LSTM model may comprise an encoder that reads the input sequence and outputs a vector which captures features from the input sequence. The number of time steps L may vary depending upon the duration of a cruise phase, which defines the fixed length as input. The internal representation of the input sequence may be repeated multiple times at a repeat layer and presented to an LSTM decoder. Such an E-D LSTM model may comprise a fully connected layer to interpret each time step in the output sequence before the final output layer. The output layer may predict a single step in the output sequence, not all L steps at once. To that end, the interpretation layer and the output layer can be wrapped in a TimeDistributed wrapper, which allows the wrapped layers to be used for each time step from the decoder. Such a TimeDistributed wrapper may create a fully connected (e.g., dense) layer applied separately to each time step. This enables the LSTM decoder to figure out the context required for each step in the output sequence, and the wrapped, dense layers to interpret each time step separately, but reusing the same weights to perform the interpretation.

When included, a CNN LSTM E-D model may include first and second CNN layers that act as the encoder. The first CNN layer may read across the input sequence and project the results onto feature maps. The second CNN layer may perform the same operation on the feature maps created by the first CNN layer, attempting to amplify any salient features. A max pooling layer may simplify the feature maps by keeping the one quarter of the values having maximum signal. The distilled feature maps, downstream of the max pooling layer, can be flattened in a flattening layer into one long vector, which after repetition in a repeat layer, may be used as input to the decoding process. The decoder may be another LSTM hidden layer, which may be followed by a TimeDistributed wrapper that feeds the output layer.

When included, a ConvLSTM E-D model may use a CNN layer to read the input into the LSTM units. ConvLSTM is a type of recurrent neural network for spatio-temporal prediction that provides convolutional structures in both the input-to-state and state-to-state transitions. The ConvLSTM determines the future state of a certain cell in the grid by the inputs and past states of its local neighbors. In some examples, the CNN layer is arranged logically upstream of a flattening layer, a repeat layer, an LSTM decoder and a TimeDistributed layer.

Output engine 606 is configured to expose at least a portion of the hidden state of trainable model 608, as developed by training. The manner of 'exposure' of the portion of the hidden state may vary from one implementation to the next. In particular, this disclosure contemplates a scenario in which one computer system receives and processes training data for a great many prior flights and is then tasked to make predictions based on the hidden state developed therein. In other words the trainable machine, after development of the hidden state is the trained machine. In this scenario, exposure means only that the portion of the hidden state required for the predictions is made available to a prediction engine (vide infra). For instance, the data structure holding the weights and coefficients characterizing the hidden state may be scoped in a way that enables access by the prediction engine. This disclosure also contemplates a scenario in which the computer system that receives and processes the training data is distinct from one or more computer systems tasked with making the predictions. In other words, the trainable machine may be distinct from the trained machine. In that scenario, exposure of the portion of the hidden state means that the weights and coefficients required for predictions are communicated from the computer system that has processed the training data to the one or more computer systems tasked with making the predictions. After appropriate training, trainable machine 600, or another trained machine, can be used to make fuel burn and emissions predictions for aircraft flight.

Returning to FIG. 3, model training 310 yields training evaluation results 312. Model training 310 has the objective of approximating a function that maps input parameters (e.g., step profile, altitude, temperature) to a fuel burn quantity, and is thus a regression problem. As such, the function approximation is used to predict a fuel burn quantity for a particular flight under particular flight parameters and conditions. Training evaluation results 312 may evaluate such a function approximation using pertinent metrics, such as root-mean-square error (RMSE), mean absolute error (MAE), mean absolute percentage error (MAPE), etc. to quantify the trained model's quality and performance.

The training evaluation results 312 are used to perform hyperparameter tuning steps 314. Tuned hyperparameters are fed back into model training 310 on an iterative basis. Each distinct model type may expose their own set(s) of hyperparameters. In some examples, a single model may be trained and evaluated using multiple sets of hyperparameters. For each model, depending on whether it is linear (e.g., linear, lasso, or elastic-net regression), nonlinear (e.g., classification and regression trees, support vector regression, k-nearest neighbors), ensemble (e.g., adaptive boosting, extra gradient boosting, random forest regression, or extra trees regression), or neural network-based (e.g., variants of LSTM), hyperparameters may be tuned by using various search techniques (e.g., grid search, optuna, bohb, random) that reach top performance value for each model. Models are then ranked.

Some of the searched step data are treated as test data. For example, given a year's worth of flight data, 11 months may be used as training data 308 to build the model, and one month treated as "new" test data, albeit with known outcomes. In some examples, the contents of training data 308 and test data 316 are rotated over different training and prediction iterations e.g., until all available data is evaluated as test data. Test data 316 is fed into one or more trained prediction models 318 that are informed by model training 310.

Figure 7:
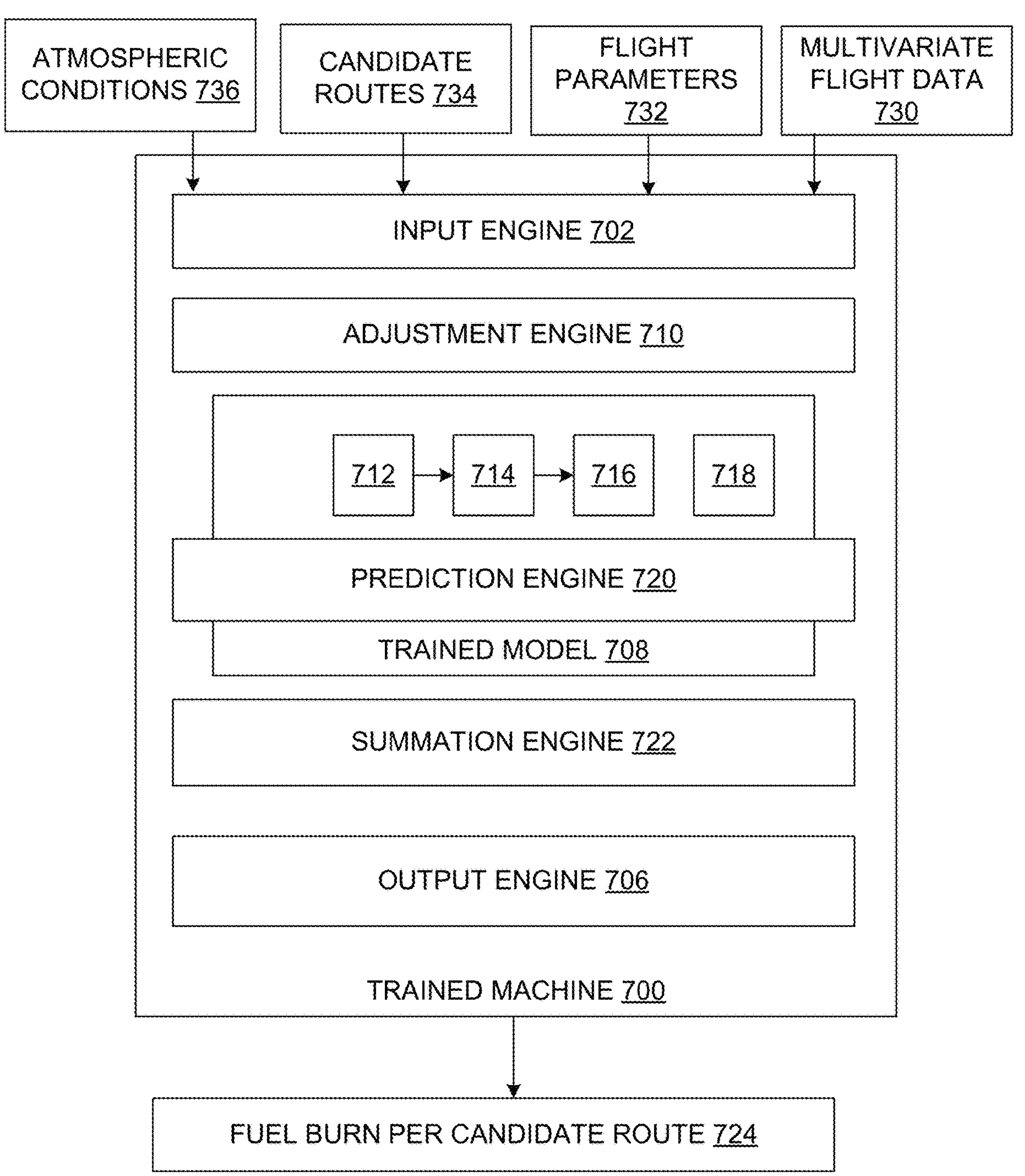
FIG. 7 shows aspects of an example machine trained to make fuel burn and emissions predictions for aircraft flight.

FIG. 7 shows aspects of an example trained machine 700 trained to make fuel burn and emissions predictions for aircraft flight. Trained machine 700 includes, inter alia, an input engine 702, a prediction engine 720, a summation engine 722, an output engine 706, a trained model 708, and an adjustment engine 710.

Input engine 702 is configured to receive at least one sequence of multivariate flight data recorded during a prior flight. Input engine 702 is further configured to receive flight parameters 732. Flight parameters may include aircraft type, airline, aircraft weight, any constraints on the flight, etc. Input engine 702 is further configured to receive one or more candidate routes 734. Any number of unique candidate routes may be input. Candidate routes may include routes for climb phases and routes for descent phases having differing step profiles, including continuous climb and descent profiles.

Input engine 702 is further configured to receive atmospheric conditions 736. Atmospheric conditions may include wind conditions, temperature, humidity, and any other weather conditions that may impact the flight of an aircraft during a cruise phase. Atmospheric conditions may be tied to one or more candidate routes 734 and may include current atmospheric conditions as well as predicted atmospheric conditions over the course of the prospective flight.

Prediction engine 720 is configured to predict a sequence of fuel burn quantities over a candidate route based on at least one sequence of multivariate flight data 730 recorded during a prior flight and on a hidden state of trained machine 700.

In some examples trained model 708 comprises a trained encoder 712 arranged logically upstream of a trained decoder 714. The encoder is trained to emit a vector that featurizes an input sequence of multivariate flight data 730; the decoder is trained to replicate the fuel burn quantities of the input sequence based on the vector, thereby generating an output sequence. In some examples the encoder and the decoder are configured according to a long short-term memory (LSTM) architecture. In some examples the trained model comprises an encoder-decoder LSTM (E-D LSTM) model, a convolutional neural-network LSTM encoder-decoder (CNN LSTM E-D) model, or a convolutional LSTM encoder-decoder (ConvLSTM E-D) model. In some examples the trained model further comprises a fully connected layer 716 configured to interpret the fuel burn quantities at each time step of the output sequence before the final output layer. In some examples the fully connected layer may be the penultimate layer of the trained model. Trained model 708 may be operated with a set of hyperparameters 718 which may evolve as trained model 708 is deployed.

Returning to FIG. 3, results of the prediction models are evaluated via heuristics 320 for top ranking algorithms. Heuristics 320 may be used to determine which models are performing best, and in turn used to select which models move on to the next round of evaluation. The number of models that move on may depend on relative performance of the models, e.g., where there is a significant drop in performance.

Heuristics 320 are fed into validation evaluation results 322. The validation evaluation results 322 are used to iteratively inform hyperparameter tuning 314. Validation evaluation results 322 may include various performance metrics, such as accuracy, standard deviation, confidence, RMSE, absolute error, percentage error, etc. Hyperparameter tuning may proceed iteratively, with successful models trained, retrained, and tested.

In this way, multiple models may be evaluated in parallel, with the top performing models iteratively selected to inform the prediction models. For example, a number of neural networks may be developed and run at the same time in parallel, then ranked, with the top k moving forward, eventually determining a single best performing model that can be used for inference. Models may be varied in terms of how many layers they have, how many neurons comprise each layer, what activation functions are used, optimization algorithms, hyperparameter values, etc.

Returning to FIG. 7, trained machine 700 includes summation engine 722. Summation engine 722 is configured to sum the fuel burn quantities over the candidate altitude changing phase, to obtain a fueling estimate as described above. Output engine 706 is configured to output the estimated fuel burn per candidate route 724. In some examples output engine 706 is further configured to output an emissions estimate based on the fueling estimate. For instance, the output engine may multiply the fuel burn estimate (in mass units) by 3.16 to output a carbon-dioxide emissions estimate.

Fuel flow will change over time across time steps, yielding changes in aircraft weight over time. Prediction engine 720 may thus be applied to determine fuel burn per time step over each candidate route, with summation engine 722 generating a total fuel burn per candidate route 724. The fuel burn per candidate route 724 may be used to determine an amount of fuel to load prior to takeoff, may be used to inform pilots and air traffic control of which candidate routes will result in the least amount of fuel burned, to optimize control of fully autonomous or partially autonomous aircraft, etc. Fuel burn per candidate route 724 may be output as a total fuel burn, as left engine fuel flow and right engine fuel flow, etc. As atmospheric conditions 736 are updated (in real time or as predicted conditions), different candidate routes and route segments may be predicted to have higher tailwinds and thus reduced fuel burn.

Figure 8:
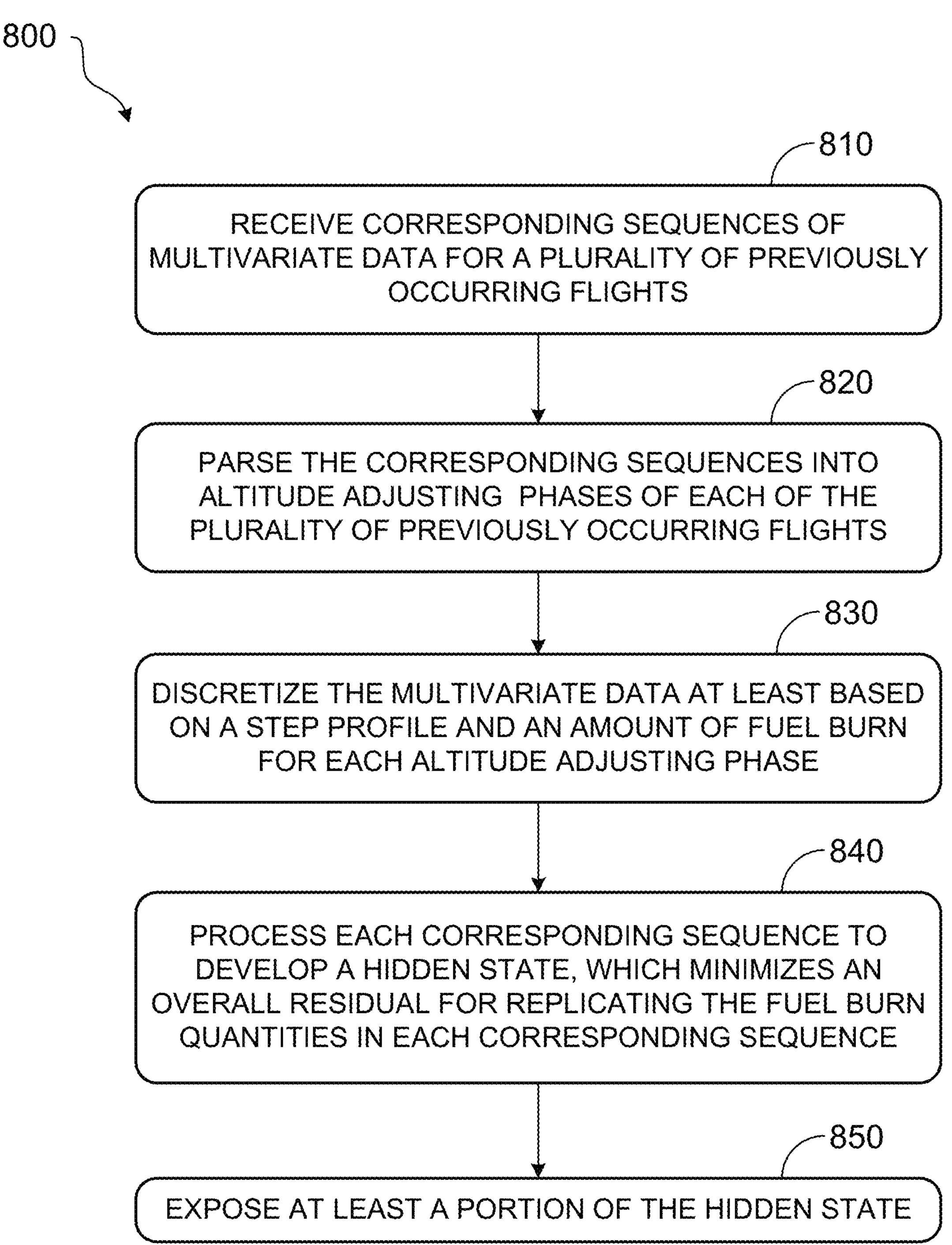
FIG. 8 shows a flow diagram for an example method of training a machine to predict fuel burn for an aircraft over an altitude changing phase route of a flight.

FIG. 8 shows a flow diagram for an example method 800 of training a machine to predict fuel burn for an aircraft over an altitude changing phase of a flight. Method 800 may be applied to a trainable machine, such as trainable machine 600.

At 810, method 800 includes receiving corresponding sequences of multivariate data for a plurality of previously occurring flights. Each sequence of multivariate flight data may be recorded during a prior flight at a frequency (e.g., 1 Hz). In some examples, the multivariate flight data may include FDR data (e.g., CPL data) selected by principle-component analysis. Included parameters may include time, latitude, longitude, altitude, aircraft weight, flight phase, fuel flow—left engine, fuel flow—right engine. Atmospheric conditions may also be provided in historical data, such as wind speed, wind direction, temperature, pressure, humidity, etc.

At 820, method 800 includes parsing the corresponding sequences into altitude adjusting phases of each of the plurality of previously occurring flights. The multivariate flight data may be separated into flight phases, such as climb phase, cruise phase, and descent phase, with the climb and descent phases extracted as altitude changing phases. Each climb phase may be defined as spanning from takeoff to top of climb within the prior flight. Each descent phase may be defined as spanning from top of descent to landing within the prior flight.

Optionally, method 800 includes adjusting each corresponding sequence to provide a common length for each altitude changing phase. For example, shorter altitude changing phases may be padded in length and/or longer altitude changing phases may be trimmed in length, as even flights with common origin and destination airports may extend over differing lengths. Parameters for padded altitude changing phases may be extrapolated from the multivariate flight data.

At 830, method 800 includes discretizing the multivariate data at least based on step profile and an amount of fuel burn for each altitude adjusting phase. As such, the multivariate data for flights with similar characteristics may be grouped together in a plurality of buckets. The multivariate flight data may be discretized based on ranges of other parameters, such as latitude, longitude, altitude, air temperature, take-off weight, etc.

At 840, method 800 includes processing each corresponding sequence to develop a hidden state, which minimizes an overall residual for replicating the fuel burn quantities in each corresponding sequence. Replicating the fuel burn quantities may comprise transforming the multivariate flight data from a previous time step in each corresponding sequence, based on the hidden state.

At 850, method 800 includes exposing at least a portion of the hidden state. In particular, this disclosure contemplates a scenario in which one computer system receives and processes training data for a great many prior flights and is then tasked to make predictions based on the hidden state developed therein. For example, exposure may mean only that the portion of the hidden state required for the predictions is made available to a prediction engine. For instance, the data structure holding the weights and coefficients characterizing the hidden state may be scoped in a way that enables access by the prediction engine. In other examples, exposure means only that the portion of the hidden state required for the predictions is made available to a prediction engine. For instance, the data structure holding the weights and coefficients characterizing the hidden state may be scoped in a way that enables access by the prediction engine.

In some examples, method 800 may further comprise training two or more machines to predict fuel burn for an aircraft over an altitude changing phase of a flight, evaluating training results for each of the two or more machines, and adjusting hyperparameters for at least one machine based on the training results. A number of models may compete with each other for higher accuracy.

Figure 9:
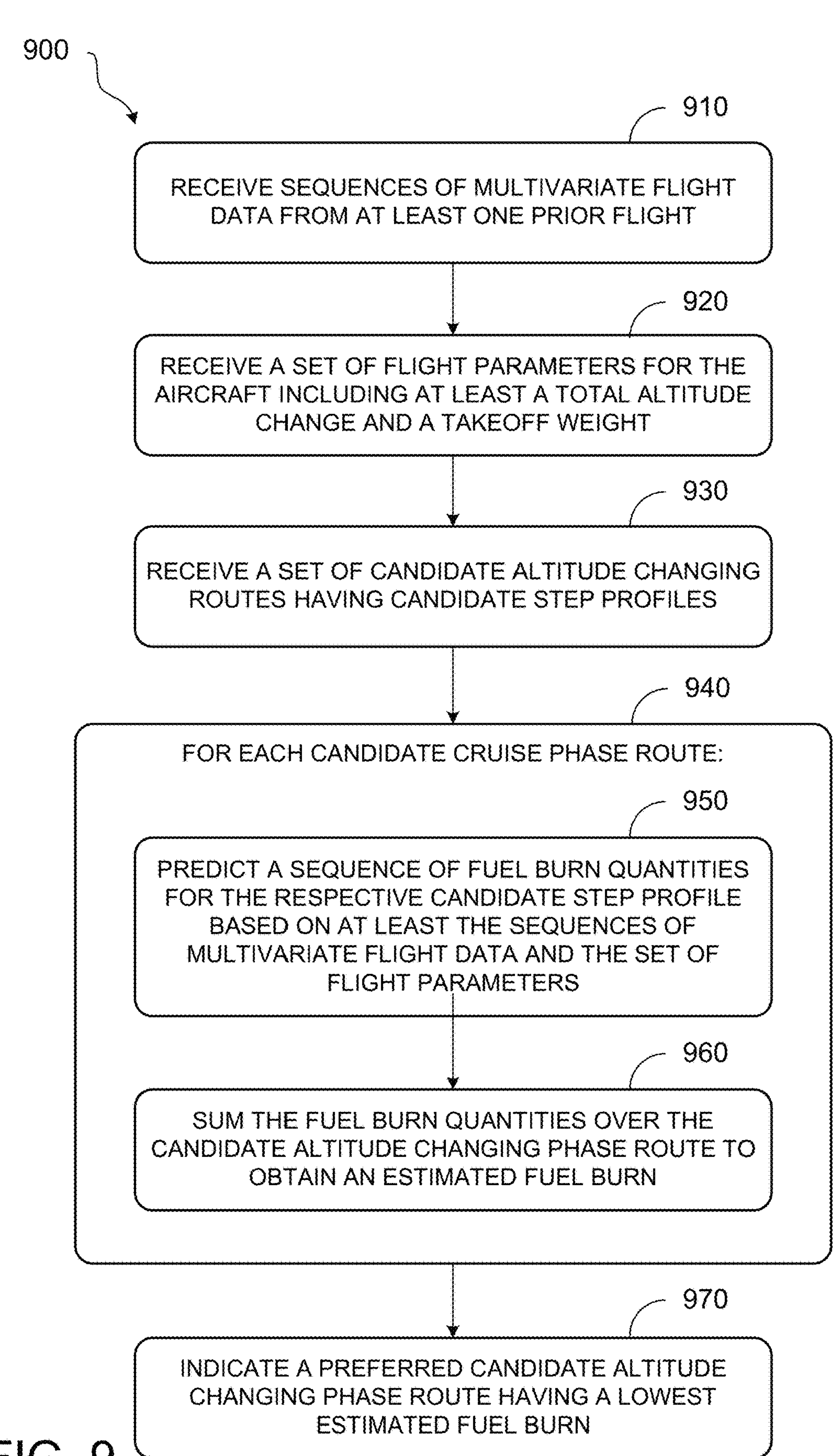
FIG. 9 shows a flow diagram for an example method of selecting a altitude changing phase route for an aircraft.

FIG. 9 shows a flow diagram for an example method 900 for selecting an altitude changing phase route for an aircraft. Method 900 may be performed by a trained machine, such as trained machine 700. At 910, method 900 includes receiving sequences of multivariate flight data from at least one prior flight. Each sequence of multivariate flight data may be recorded during a prior flight at a frequency (e.g., 1 Hz). In some examples, the multivariate flight data may include FDR data (e.g., CPL data) selected by principle-component analysis. Included parameters may include time, latitude, longitude, altitude, aircraft weight, flight phase, fuel flow—left engine, fuel flow—right engine. Atmospheric conditions may also be provided in multivariate flight data, such as wind speed, wind direction, temperature, pressure, humidity, etc.

The number of input sequences received is not particularly limited. Each input sequence comprises flight data recorded during a prior flight that shares at least some features of the planned flight. In some examples the at least one sequence of multivariate flight data shares the departure airport, the arrival airport, and the aircraft model of the planned flight. In some examples the at least one sequence of multivariate flight data comprises data which is analogous to the training data hereinabove. Such data may include FDR data selected via principal component analysis (PCA), for instance. In some examples the at least one sequence of multivariate flight data includes atmospheric (e.g., weather) data.

In some examples the input data may comprise fewer parameters than the training sequences. For instance, a suitable model may be trained for a specific airline, specific aircraft type, and specific departure and arrival airports. In that case, fewer parameters would be required for predicting fuel burn than in a more generic model.

In some examples, each sequence of multivariate flight data may share a departure airport, an arrival airport, and an aircraft specifier of a planned flight. The multivariate flight data may be separated into flight phases, such as climb phase, cruise phase, and descent phase, with the climb and/or descent phase extracted.

Each cruise phase may be defined as spanning from top of climb to top of descent within the prior flight. In some examples, a length of one or more cruise phases included in the multivariate data is adjusted to a common cruise phase length. For example, shorter cruise phases may be padded in length and/or longer cruise phases may be trimmed in length, as even flights with common origin and destination airports may extend over differing lengths. Parameters for padded cruise phases may be extrapolated from the multivariate flight data. In some examples, the multivariate flight data is discretized based on step profile. The multivariate flight data may be discretized based on ranges of other parameters, such as altitude, air temperature, take-off weight, etc.

At 920, method 900 includes receiving flight parameters for the aircraft. The received flight parameters may be assigned to a planned flight. Flight parameters include a total altitude change and a takeoff weight, and may further include airline, aircraft, take-off weight, top-of-descent weight, air restrictions, departure time, landing time window (e.g., time to landing), lateral distance to landing airport, previously selected cruise phase routes, etc.

At 930, method 900 includes receiving a set of candidate altitude changing phase routes having candidate step profiles. Each candidate climb phase route may comprise a route between an origin airport and a top of climb. Each candidate descent phase route may comprise a route between a top of descent and a destination airport. The set of candidate altitude changing phase routes may include routes that are available for a planned flight (e.g., not being assigned to another aircraft, not in the path of severe weather). Each step profile may include a number of steps, length of steps, total lateral distance, climb or descent angle, etc. Step lengths and altitude changing angles may vary per segment of the altitude changing phase route.

At 940, method 900 includes iterations for each candidate cruise phase route. At 950, method 900 includes predicting a sequence of fuel burn quantities based on at least the sequences of multivariate flight data and the set of flight parameters. In other words, in a flight (or portion of a flight) characterized by N time steps, a distinct fuel burn prediction is made for each of the N time steps. The prediction is based on the at least one input sequence and on a hidden state of the trained machine. During training, as noted above, a corresponding sequence of multivariate flight data recorded during each of a pre-selected series of prior flights is processed in a trainable machine to develop the hidden state. The hidden state is a state that minimizes an overall residual for replicating the fuel burn quantities in each corresponding sequence.

Predicting a sequence of fuel burn quantities can be further based on a hidden state of a trained machine. Predicting the sequence of fuel burn quantities may comprise transforming the multivariate flight data from a previous time step in the at least one sequence based on the hidden state. For each of a pre-selected series of prior flights, a corresponding sequence of multivariate flight data recorded during the prior flight may be processed in a trainable machine to develop the hidden state. The hidden state may be configured to minimize an overall residual for replicating the fuel burn quantities in each corresponding sequence.

Predicting the sequence of fuel burn quantities may comprises transforming the multivariate flight data from a previous time step in the at least one sequence based on the hidden state. To that end, an encoder may emit a vector featurizing the input sequence. A decoder may decode the vector to generate the output sequence.

At 960, method 900 includes summing the fuel burn quantities over the candidate altitude changing phase route to obtain an estimated fuel burn. In some examples, the estimated fuel burn may be separated into left-engine fuel burn and right-engine fuel burn. At 970, method 900 includes indicating a preferred candidate cruise phase route having a lowest estimated fuel burn. For example, the preferred candidate cruise phase route may be indicated to a pilot, may be indicated in a flight plan, may be sent to the federal aviation administration, etc.

In some examples, method 900 may be performed prior to fueling an aircraft for takeoff. As such, in some examples, method 900 further includes fueling the aircraft based at least on the lowest estimated fuel burn. For example, the aircraft may be fueled based on an estimated fuel burn for a climb phase, an estimated fuel burn for a descent phase, and the lowest estimated fuel burn for the cruise phase. The aircraft may further be fueled based on a safety margin of fuel.

In some examples, the aircraft is at least partially autonomous. In such examples, method 900 may further comprise controlling the aircraft to follow the preferred candidate altitude changing phase route.

In some examples, method 900 may be performed while an aircraft is in flight. As such, the method may include receiving candidate descent phase routes from the aircraft's current location to top of descent at the destination airport. A currently planned descent route may be adjusted or changed as flight parameters change and an updated descent phase route is determined to indicate a reduced fuel burn quantity.

Figure 10:
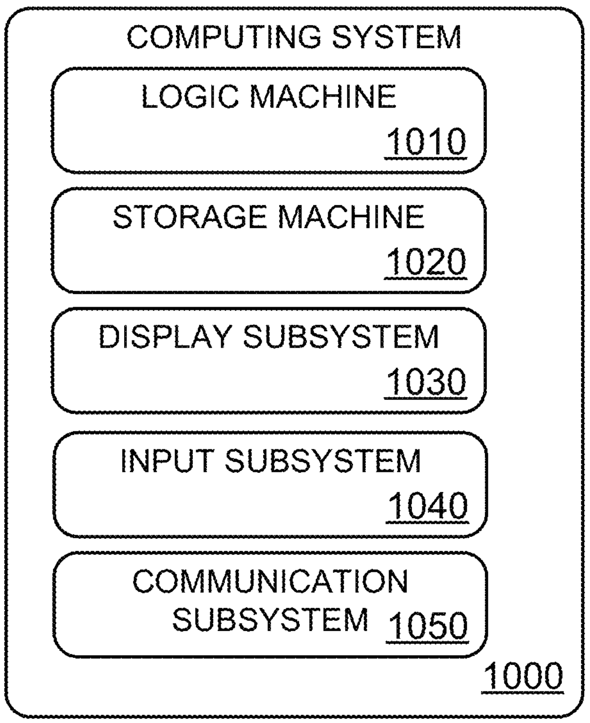
FIG. 10 schematically shows aspects of an example computing system.

FIG. 10 schematically shows a non-limiting embodiment of a computing system 1000 that can enact one or more of the methods and processes described above. Computing system 1000 is shown in simplified form. Computing system 1000 may take the form of one or more personal computers, server computers, tablet computers, home-entertainment computers, network computing devices, gaming devices, mobile computing devices, mobile communication devices (e.g., smart phone), and/or other computing devices.

Computing system 1000 includes a logic machine 1010 and a storage machine 1020. Computing system 1000 may optionally include a display subsystem 1030, input subsystem 1040, communication subsystem 1050, and/or other components not shown in FIG. 10. Machine learning pipeline 300, trainable machine 600 and trained machine 700 are examples of computing system 1000.

Logic machine 1010 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 1020 includes one or more physical devices configured to hold instructions executable by the logic machine to implement the methods and processes described herein. When such methods and processes are implemented, the state of storage machine 1020 may be transformed—e.g., to hold different data.

Storage machine 1020 may include removable and/or built-in devices. Storage machine 1020 may include optical memory (e.g., CD, DVD, HD-DVD, BLU-RAY DISC (TM) (e.g., optical disc), etc.), semiconductor memory (e.g., RAM, EPROM, EEPROM, etc.), and/or magnetic memory (e.g., hard-disk drive, floppy-disk drive, tape drive, MRAM, etc.), among others. Storage machine 1020 may include volatile, nonvolatile, dynamic, static, read/write, read-only, random-access, sequential-access, location-addressable, file-addressable, and/or content-addressable devices.

It will be appreciated that storage machine 1020 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 1010 and storage machine 1020 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 1000 implemented to perform a particular function. In some cases, a module, program, or engine may be instantiated via logic machine 1010 executing instructions held by storage machine 1020. It will be understood that different modules, programs, and/or engines may be instantiated from the same application, service, code block, object, library, routine, application programming interface (API), function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 1030 may be used to present a visual representation of data held by storage machine 1020. This visual representation may take the form of a graphical user interface (GUI). As the herein described methods and processes change the data held by the storage machine, and thus transform the state of the storage machine, the state of display subsystem 1030 may likewise be transformed to visually represent changes in the underlying data. Display subsystem 1030 may include one or more display devices utilizing virtually any type of technology. Such display devices may be combined with logic machine 1010 and/or storage machine 1020 in a shared enclosure, or such display devices may be peripheral display devices.

When included, input subsystem 1040 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 1050 may be configured to communicatively couple computing system 1000 with one or more other computing devices. Communication subsystem 1050 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 1000 to send and/or receive messages to and/or from other devices via a network such as the Internet.

Further, the disclosure comprises configurations according to the following examples.

Example 1. A method for selecting an altitude changing phase route for an aircraft, comprising: receiving sequences of multivariate flight data from at least one prior flight; receiving a set of flight parameters for the aircraft including at least a total altitude change and a takeoff weight; receiving a set of candidate altitude changing phase routes having candidate step profiles; for each candidate altitude changing phase route, predicting a sequence of fuel burn quantities for the respective candidate step profile based on at least the sequences of multivariate flight data and the set of flight parameters; and summing the fuel burn quantities over the candidate altitude changing phase route to obtain an estimated fuel burn; and indicating a preferred candidate altitude changing phase route having a lowest estimated fuel burn.

Example 2. The method of example 1, further comprising fueling the aircraft based at least on the lowest estimated fuel burn.

Example 3. The method of examples 1 to 2, wherein the aircraft is at least partially autonomous, the method further comprising: controlling the aircraft to follow the preferred candidate altitude changing phase route.

Example 4. The method of examples 1 to 3, wherein the altitude changing phase is a climb phase.

Example 5. The method of examples 1 to 4, wherein the altitude changing phase is a descent phase.

Example 6. The method of examples 1 to 5, wherein the flight parameters further include a top-of-descent weight of the aircraft.

Example 7. The method of examples 1 to 6, wherein the flight parameters further include a time to landing.

Example 8. The method of examples 1 to 7, wherein the multivariate flight data is discretized based on step profile.

Example 9. The method of examples 1 to 8, wherein the flight parameters further include a lateral distance.

Example 10. The method of examples 1 to 9, wherein a length of one or more altitude changing phases included in the multivariate flight data is adjusted to a common altitude changing phase length.

Example 11. The method of examples 1 to 10, wherein predicting the sequence of fuel burn quantities is further based on a hidden state of a trained machine, wherein for each of a pre-selected series of prior flights, a corresponding sequence of multivariate flight data recorded during the prior flight is processed in a trainable machine to develop the hidden state, which minimizes an overall residual for replicating the fuel burn quantities in each corresponding sequence.

Example 12. A machine trained to make fuel burn predictions for aircraft flight, comprising: an input engine configured to: receive sequences of multivariate flight data from at least one prior flight; receive a set of candidate altitude changing phase routes having candidate step profiles; and receive a set of flight parameters including at least a total altitude change and a takeoff weight; a prediction engine configured to, for each candidate altitude changing phase route, predict a sequence of fuel burn quantities for the respective candidate step profile based on at least the sequences of multivariate flight data and the set of flight parameters; a summation engine configured to sum the fuel burn quantities over each candidate altitude changing phase route to obtain an estimated fuel burn; and an output engine configured to indicate a preferred candidate altitude changing phase route having a lowest estimated fuel burn.

Example 13. The machine of example 12, wherein the candidate altitude changing phase is one of a climb phase and a descent phase.

Example 14. The machine of examples 12 to 13, wherein the multivariate flight data is discretized based on step profile.

Example 15. The machine of examples 12 to 14, further comprising an adjustment engine configured to adjust a length of one or more altitude changing phases included in the multivariate flight data to a common altitude changing phase length.

Example 16. The machine of examples 12 to 15, further comprising a trained encoder arranged logically upstream of a trained decoder, wherein the encoder is trained to emit a vector that featurizes an input sequence of multivariate flight data, and wherein the decoder is trained to replicate the fuel burn quantities of the input sequence based on the vector, thereby generating an output sequence.

Example 17. The machine of examples 12 to 16, wherein the encoder and the decoder are configured according to a long short-term memory (LSTM) architecture.

Example 18. The machine of examples 12 to 17, further comprising a fully connected layer configured to interpret the fuel burn quantities at each time step of the output sequence.

Example 19. A method of training a machine to predict fuel burn for an aircraft over an altitude changing phase of a flight, comprising: receiving corresponding sequences of multivariate data for a plurality of previously occurring flights; parsing the corresponding sequences into altitude changing phases of each of the plurality of previously occurring flights; discretizing the multivariate data at least based on a step profile and an amount of fuel burn for each cruise phase; processing each corresponding sequence to develop a hidden state, which minimizes an overall residual for replicating the amount of fuel burn in each corresponding sequence; and exposing at least a portion of the hidden state.

Example 20. The method of example 19, further comprising: training two or more machines to predict fuel burn for the aircraft over each altitude changing phase; evaluating training results for each of the two or more machines; and adjusting hyperparameters for at least one machine based on the training results.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for selecting an altitude changing phase route for an aircraft that is at least a partially autonomous aircraft, the method performed by a computing system of one or more computing devices, the method comprising:

receiving sequences of multivariate flight data from at least one prior flight, the multivariate flight data discretized based on step profiles and an amount of fuel burn for altitude changing phases of each prior flight, each step profile comprising a plurality of steps, each step characterized by a step size indicating a duration where the aircraft remains level, and a threshold indicating a delta flight level between time steps;

receiving a set of flight parameters for the aircraft including at least a total altitude change for a planned altitude changing phase and a takeoff weight;

receiving a set of candidate altitude changing phase routes, each candidate altitude changing phase route having a separate candidate step profile;

for each candidate altitude changing phase route, predicting a sequence of fuel burn quantities for the respective candidate step profile based on at least the sequences of multivariate flight data and the set of flight parameters; and summing the fuel burn quantities over the candidate altitude changing phase route to obtain an estimated fuel burn;

indicating a preferred candidate altitude changing phase route having a lowest estimated fuel burn; and controlling the aircraft to follow the preferred candidate altitude changing phase route.

2. The method of claim 1, further comprising fueling the aircraft based at least on the lowest estimated fuel burn.

3. The method of claim 1, wherein the planned altitude changing phase is a climb phase.

4. The method of claim 1, wherein the planned altitude changing phase is a descent phase.

5. The method of claim 4, wherein the flight parameters further include a top-of-descent weight of the aircraft.

6. The method of claim 4, wherein the flight parameters further include a time to landing.

7. The method of claim 1, wherein the flight parameters further include a lateral distance.

8. The method of claim 7, wherein a length of one or more altitude changing phases included in the multivariate flight data is adjusted to a common altitude changing phase length.

9. The method of claim 1, wherein predicting the sequence of fuel burn quantities is further based on a hidden state of a trained machine, the hidden state developed in a trainable machine, wherein for each of a pre-selected series of prior flights, a corresponding sequence of multivariate flight data recorded during a respective prior flight of the pre-selected series of prior flights is processed in the trainable machine to develop the hidden state, which minimizes an overall residual for replicating the fuel burn quantities in each corresponding sequence.

10. The method of claim 1, wherein discretizing multivariate flight data includes grouping together multivariate flight data for flights with similar characteristics into a plurality of buckets.

11. The method of claim 1, wherein discretizing multivariate flight data includes adjusting a combination of step size and threshold based on which combinations produce datasets with sufficient size to evaluate candidate altitude changing phase routes.

12. The method of claim 1, wherein the sequence of fuel burn quantities for the respective candidate step profile is further based on atmospheric conditions for the candidate altitude changing phase route.

13. A machine trained to make fuel burn predictions for aircraft flight, comprising:

an input engine configured to:

receive sequences of multivariate flight data from at least one prior flight of an aircraft, the multivariate flight data discretized based on step profiles and an amount of fuel burn for altitude changing phases of each prior flight, each step profile comprising a plurality of steps, each step characterized by a step size indicating a duration where the aircraft remains level, and a threshold indicating a delta flight level between time steps;

receive a set of candidate altitude changing phase routes, each candidate altitude changing phase route having a separate candidate step profile; and receive a set of flight parameters including at least a total altitude change for a planned altitude changing phase and a takeoff weight;

a trained encoder arranged logically upstream of a trained decoder, wherein the encoder is trained to emit a vector that featurizes an input sequence of multivariate flight data, and wherein the decoder is trained to replicate fuel burn quantities of the input sequence based on the vector, thereby generating an output sequence;

a prediction engine configured to, for each candidate altitude changing phase route, predict a sequence of fuel burn quantities for the respective candidate step profile based on at least the sequences of multivariate flight data, the set of flight parameters, and the output sequence;

a summation engine configured to sum the fuel burn quantities over each candidate altitude changing phase route to obtain an estimated fuel burn; and an output engine configured to indicate a preferred candidate altitude changing phase route having a lowest estimated fuel burn.

14. The machine of claim 13, wherein the planned altitude changing phase is one of a climb phase and a descent phase.

15. The machine of claim 13, wherein the multivariate flight data is discretized based on step profile.

16. The machine of claim 13, further comprising an adjustment engine configured to adjust a length of one or more altitude changing phases included in the multivariate flight data to a common altitude changing phase length.

17. The machine of claim 13, wherein the encoder and the decoder are configured according to a long short-term memory (LSTM) architecture.

18. The machine of claim 17, further comprising a fully connected layer configured to interpret the fuel burn quantities at each time step of the output sequence.

19. A system for controlling an aircraft that is at least a partially autonomous aircraft, the system comprising:

a controller comprising one or more logic machines and one or more storage machines, the one or more storage machines storing instructions that when executed, cause the controller to:

receive sequences of multivariate flight data from at least one prior flight, the multivariate flight data discretized based on step profiles and an amount of fuel burn for altitude changing phases of each prior flight, each step profile comprising a plurality of steps, each step characterized by a step size indicating a duration where the aircraft remains level, and a threshold indicating a delta flight level between time steps;

receive a set of flight parameters for the aircraft including at least a total altitude change for a planned altitude changing phase and a takeoff weight;

receive a set of candidate altitude changing phase routes, each candidate altitude changing phase route having a separate candidate step profile;

for each candidate altitude changing phase route, predict a sequence of fuel burn quantities for the respective candidate step profile based on at least the sequences of multivariate flight data and the set of flight parameters; and sum the fuel burn quantities over the candidate altitude changing phase route to obtain an estimated fuel burn;

indicate a preferred candidate altitude changing phase route having a lowest estimated fuel burn; and control the aircraft to follow the preferred candidate altitude changing phase route.

20. The system of claim 19, wherein the one or more storage machines further storing instructions that when executed, cause the controller to:

fuel the aircraft based at least on the lowest estimated fuel burn.

* * * * *